United States Patent [19]

Lindeman et al.

[11] Patent Number: 4,946,737
[45] Date of Patent: Aug. 7, 1990

[54] GASKET COMPOSITION HAVING EXPANDED MICROSPHERES

[75] Inventors: Charles M. Lindeman; Ralph D. Andrew, both of Lancaster, Pa.

[73] Assignee: Armstrong World Industries, Inc., Lancaster, Pa.

[21] Appl. No.: 92,721

[22] Filed: Sep. 3, 1987

[51] Int. Cl.$^5$ .................... B65D 53/00; F16J 15/00
[52] U.S. Cl. .................... 428/283; 277/DIG. 6; 428/332; 428/338; 521/54; 523/218
[58] Field of Search ............ 428/323, 313.3, 225, 428/240, 241, 245, 313.5, 313.9, 314.2, 316.6, 332, 283, 325, 327, 317.9, 338; 521/54; 523/218; 277/227, 228, DIG. 6

[56] References Cited

U.S. PATENT DOCUMENTS

| | | | |
|---|---|---|---|
| 2,473,319 | 6/1949 | Winkelmann | 162/168 |
| 3,293,114 | 12/1966 | Kenaga et al. | 162/168 |
| 3,300,421 | 1/1967 | Merriman et al. | 525/139 |
| 3,472,798 | 10/1969 | Pitforth et al. | 525/125 |
| 3,494,826 | 2/1970 | Scheiber | 162/168 |
| 3,524,794 | 8/1970 | Jonnes et al. | 428/313.3 |
| 3,556,934 | 1/1971 | Meyer | 162/169 |
| 3,720,579 | 3/1973 | Vassilliades et al. | 162/162 |
| 3,740,062 | 6/1973 | Robias | 277/235 B |
| 3,864,181 | 2/1975 | Wolinski et al. | 521/59 |
| 4,049,856 | 9/1977 | Adams | 428/131 |
| 4,180,211 | 12/1979 | Olcott et al. | 428/313.3 |
| 4,271,228 | 6/1981 | Foster et al. | 428/241 |
| 4,286,977 | 9/1981 | Klein | 162/169 |
| 4,330,442 | 5/1982 | Lindeman et al. | 524/16 |
| 4,483,889 | 11/1984 | Andersson | 162/169 |
| 4,485,192 | 11/1984 | Gibbs et al. | 521/54 |
| 4,619,734 | 10/1986 | Andersson | 162/111 |
| 4,699,810 | 10/1987 | Blakeman et al. | 427/284 |

*Primary Examiner*—William J. Van Balen

[57] ABSTRACT

A gasket is described which contains microspheres which expand inside the gasket sheet material after the gasket sheet is formed. Such gaskets are especially useful to provide a seal against fluid leaks at significantly lower pressures due to the presence of the microspheres. Some microspheres can expand during use.

34 Claims, No Drawings

GASKET COMPOSITION HAVING EXPANDED MICROSPHERES

BACKGROUND OF THE INVENTION

1. Field of the Invention

This invention relates to a gasket composition which is especially capable of sealing at low flange pressures.

Numerous materials are known which are suitable for use in gaskets to provide a seal between contiguous or abutting members or parts. Such gaskets are employed to seal against fluid (air and liquid) leaks in applications such as cylinder heads and valves. In these applications, it is necessary and desireable for the gasket to be capable of sealing against fluid leak at low operational flange pressures.

Characteristics desirable for a serviceable gasket in addition to giving a good seal at flange pressures as low as 500 psi, include: good compressive strength up to 2,000 psi and good compression/recovery. A gasket should therefore be durable for the stresses experienced during service, resistant to the temperatures which it experiences and it should be flexible but resistant to mechanical deformation.

According to the instant invention there is provided a water laid gasket composition which has good compression/recovery, and is capable of giving a superior seal against fluid leaks at low flange pressures.

BRIEF DESCRIPTION

The instant gasket composition is a substantially homogeneous mixture of intermeshed fibers, expanded and/or expandable polymeric microspheres and a binder, wherein the microspheres expanded inside the gasket sheet after it was formed. In preferred embodiments, a filler is also included.

The polymeric microspheres are incorporated with the other ingredients as unexpanded, inflatable microspheres. They are then inflated to a larger volume at some time after the gasket material formed. The gasket material is "formed" when it is wet laid as a sheet. The microspheres can then be inflated by exposing them to the minimum amount of heat needed for expansion.

Polymeric microspheres which can permissively be used includes: A) Thermoplastic microspheres which contain a volatile blowing agent such as a solid or liquid which becomes a gas at a certain temperature: when an effective amount of heat is used the blowing agent causes the outer layer to inflate; frequently, the outer layer must be softened with heat or steam for optimum expansion; and B) Microspheres of polymeric foam which also expand when heated, typically due to the action of a blowing agent, can also be used.

Procedures for the preparation of microspheres which expand upon exposure to specific levels of heat are known in the art and such spheres are also commercially available.

Any other ingredients desired or needed for the instant gaskets, such as fiber, filler, and binder can be selected from any of these materials which are available. Preferred combinations can be formed using fibers, fillers, and binders which are typically used in the gasketing industry to achieve specific characteristics; or for specific applications.

The instant gasket is formed by mixing the microspheres with the fiber in an aqueous slurry with agitation. After preparing a suspension, the beater addition water-laid gasket preparation can then be used. In the preparation forming the wet gasket sheet, the fibers, microspheres, binder, and, if desired, a filler and additives such as antioxidants are flocculated out of an aqueous suspension using a flocculant and a base and then water removal (dewatering). Water removal usually includes draining and wet-laying into a sheet and roll pressing the wet sheet squeezing out more water. This sheet forming procedure advantageously insures the uniform distribution of the microspheres in the gasket sheet.

The unexpanded, inflatable microspheres can be expanded during or after gasket drying by using the amount of heat needed to cause microspheric expansion. Usually a minimum of about a 100° C. temperature will be required for expansion. Advantageously, the microspheres expand to fill the cavities or voids which tend to develop in drying gasket material. Since the microspheres, moreover, are substantially uniform in distribution throughout the gasket, the volumetric increase of the microspheres allows this pore-filling to be similarily uniform throughout the gasket.

The term "internal densification" is used herein to refer to the decrease in or elimination of open space (pores or cavities) within the gasket by the expansion of the microspheres inside the gasket material after its formation. The expanding microspheres take up at least a portion of the internal cavity areas which are typically present as hollow spaces within the gasket. The microspheres therefore make the gasket less porous. In operation, these cavities or spaces are less able to allow passage of fluid (either liquid or gas). Thus, the internal densification will operate to provide both a more effective seal, and a good seal at lower pressures. Since the microspheres expand into the internal cavity areas of the gasket, effective service and a good seal are still obtainable even if operating pressures should cause microspheric rupturing.

The term "external densification" refers to the application of pressure to the outside of the gasket by pressing or calendering it in a uniform manner to press the gasket material into a thinner and more compact sheet. This decreases the gasket volume, making the gasket more dense.

In a preferred embodiment of the instant invention, the inflation of the microspheres occurs during the drying step by using a drying temperature which will cause expansion of the spheres. Since many of the internal cavities develop during the drying step, this embodiment allows the internal densification to occur as cavities develop.

Other embodiments provide for the expansion of the microsphere: after drying; before, during or after the gasket is subjected to external densification; and/or during use. High temperature expanding spheres are used in a gasket material when it is desired that the microspheric expansion occur when gasket is in use.

It is permissable to include more than one type of microsphere. Different types of unexpanded microspheres can be included which expand at different temperatures, and/or in different amounts can be used. By using two or more different types of microspheres which expand at different temperature levels, expansion can occur at more than one time. Thus, for example, expansion of microspheres could occur both during drying and as the gasket is being used by using a hightemperature expansion sphere. The uniform distribution inside the gasket insures that the volume change of the spheres occurs throughout the gasket in a substantially uniform manner even if different types of microspheres are used which expand in different amounts and/or at different times.

DETAILED DESCRIPTION

The instant gasketing material is formed by flocculation of the ingredients for the gasket out of an aqueous suspension into a solid mass which is dewatered by wet-laying with or without roll pressing into the sheet material. Usually a sheet-forming (papermaking) apparatus is used.

In using this method to prepare the gasket, a plurality of the microspheres are combined in an aqueous solution preferably, along with the selected fiber. In preferred embodiments, where a filler is used it is also combined in the aqueous suspension before flocculation. Usually the suspension is prepared using enough water to maintain the solids level at from about 0.5 to about 2%. Agitation is used to saturate the solids ingredients and achieve a uniformly mixed suspension of the solids material.

Although the binder can be mixed in the suspension along with the other ingredients, before the addition of the flocculant and base, the binder is preferably added after the flocculant and base are added. In which case, the binder flocculates onto the surface of the flocculated solids mixture of fiber, microsphere, and filler (if present). In any case, the flocculanted binder will hold the fiber, microspheres and filler (if present).

After the gasket ingredients are combined in the suspension, an appropriately selected flocculant and base are used to flocculate the gasket material into a solid mass. The base is used in the amount needed to place the pH of the aqueous mixture in the range of from about 7 to about 8. A preferred base can be selected from the group consisting of: ammonium hydroxide, sodium carbonate; sodium hydroxide, potassium hydroxide, and sodium bicarbonate.

Any flocculant can be used in an effective amount to achieve flocculation. Suitable flocculants can be provided by using a salt of one or more of a cationic member selected from the group consisting of aluminum, magnesium, and barium. An aluminum salt is preferred and aluminum sulfate (alum) is most preferred.

Typically the aqueous mixture is agitated until the flocculation is complete. The flocculated solids material is then formed into a sheet of gasket material. Usually this is referred to as wet-laying. Water removal is used during this step. An ordinary paper-making apparatus is generally used. The formed gasket sheet is then dried. A very effective and convenient type of drying is the drum drier. In a preferred embodiment of the instant invention, expansion of the microspheres advantageously is achieved during this step.

Microspheres which, for optimum expansion, require both steam and heat expand well during drying. The drying of the gasket itself provides the steam. The drying of the gasket material is frequently accomplished at a temperature in the range of from about 100° C. to about 160° C. A microsphere which expands with or without steam within this temperature range can be selected so that as drying occurs expansion of the microsphere will occur.

In another embodiment a microsphere is included which expands at a temperature in excess of the temperature at which the gasket is dried. The microspheres can be expanded by subjecting the gasket to the required amount of heat at any desired point in time after drying. This includes before or during external densification, after external densification but before cutting, after cutting, and even during use.

When expanding the microsphere during external densification, the necessary heat is applied in addition to the external pressure or the calendering. Usually, an external pressure in the range of from about 500 to about 2,000 psi (pounds per square inch) is used. In such a case, the microspheres will expand to limit the flattened cavities of the gasket.

Microspheres which expand at temperatures that are: experienced during gasket use, or which are higher than temperatures experienced during gasket use can provide extended benefits during the lifetime use of the gasket. As the gasket is used, expanding spheres can help maintain and improve a good seal, even at low pressures; they can also help to maintain and even improve compression/recovery. Microspheres which expand at temperatures in excess of gasket use are further advantageous in that it allows control over the precise point in the lifetime of the gasket at which the microspheres can be expanded. In such a case when expansion of the spheres is desired, whether it is to extend or improve the gasket's serviceability for compression/recovery or for its sealability, the correct amount of heat can be applied. One method which would allow the microspheres to be conveniently expanded during gasket use is by the application of steam and hot air. As another alternative, the gasket can be steam-pressed.

The type of use intended for a gasket is one determinative factor which influences the microsphere expansion temperatures desired for gaskets having microspheres which are to expand either at some selected point in time during the life of the gasket, or when the gasket is actually in place and in use. For gaskets exposed to temperatures caused by hot engine oil or hot engine water, the spheres desirably would expand at a temperature in excess of about 100° C., desireably, in the range of from about 100° to about 200° C. If it is desired that the gasket expand while it is actually in place and operating, the desired temperature range for the microsphere expansion is from about 100° to about 155° C. When it is desirable to be able to select a time period during gasket life for sphere expansion, the microspheres should preferably expand at a temperature of from about 145° to 200° C.; this temperature range is slightly higher than the temperatures typically experienced by gaskets due to the proximity of hot oil or water. By including microspheres which expand at this slightly higher temperature range, expansion can be triggered by the intentional application of heat. It is also possible to allow expansion to occur when engine temperatures get extremely hot.

Other gasket uses require gaskets to encounter temperatures caused by cylinder heads and exhaust manifolds. For such applications, it might be desired to use microspheres which expand at temperatures in the range of from about 200° to 600° C.

The instant gaskets are still effective even when the microspheres selected soften during gasket use. To maintain optimum performance, however, they should not completely melt at operating temperatures actually experienced by the gasket. Generally, the microspheres should be capable of withstanding the working temperature range of the particular gasket.

It has been noted that the more flexible microspheres tend to become less spherical (somewhat oval) during pressing and later in use. This would be especially true with larger microspheres. Good compression/recovery performance, and improved gasket sealability, at low pressures however, is still obtained. Even if expanded (hollow) spheres within the gasket should rupture, adequate plugging of the spaces within the gasket is still accomplished by the ruptured sphere body. Thus, fluid flow through the gasket is still impeded and an improved seal against fluid flow is still obtained, although for optimum performance, the spheres should be able to withstand the pressures to which the gasket is subjected without rupturing, or the expandable microspheres used should be polymeric foam since foam does not tend to rupture when highly compressed.

The expanded microspheres are generally all less than 500 microns in average diameter and the unexpanded, inflatable spheres are generally all less than 75 microns in average diameter. An acceptable size range for the average diameter of the expanded microspheres, used with the instant gasket materials is in the range of from about 500 to about 20 microns in diameter. Unexpanded microspheres generally will have an average diameter size in the range of from about .5 to about 75 microns. For applications which required thicker gaskets (1.5mm-5 mm) the larger expanded microspheres (greater than 150 but less than 500 microns as an average diameter) are desirable. Excellent performance, however, is obtained from expanded microspheres less than 200 microns in average diameter. For gaskets having a thickness less than about 1.75 mm, smaller microspheres are more preferred, although smaller spheres can also be used in larger gaskets. A useful size range for substantially all of the expanded microspheres in the instant gasket materials is from about 20 to about 175 microns in average diameter; and a more preferred average size is in the range of from about 80 to about 100 microns in average diameter. These ranges, moreover, are especially preferred for gaskets less than 1.75 mm in thickness.

Acceptably, the expansion of the microspheres should provide an overall microsphere volumetric increase of at least 10% inside the gasket material: although a more substantial increase of at least about 25% is preferred. In fact, through commercially available microspheres or by using the present technology, it is possible and in fact relatively easy to utilize spheres which at least double in diameter size during expansion; preferably the spheres will expand to a diameter that is from 2 to 11 times the original diameter. Even more preferred are the microspheres which expand to an average diameter which is from 5 to 11 times the original average diameter of the microsphere. Microspheres which give such large expansions have been found to provide an excellent seal at low pressure even when they are used in low concentrations. Preferred unexpanded microspheres are substantially all less than 15 microns (from 1 to 15 microns) as an average diameter and will at least double in diameter during expansion; more preferably such spheres expand to a size of from about 20 to 175 microns in average diameter.

The term "average diameter" used above refers to the average measurement of the diameter of an individual sphere. The microspheres tend to vary in size between individual spheres. When a size range is given, it is intended that substantially all of the microspheres would fall within that range.

The thickness of the gasket will generally depend on the type of use contemplated. An acceptable thickness for the instant gaskets is in the range of from about 0.25 millimeters to about 5 millimeters.

The materials comprising the instant gaskets can acceptably be used in the following amounts: the amount of fiber can range from about 5 to about 75% by weight of the total amount of the material; the binder can range from about 3 to about 60% by weight of the material; and the microspheres can range from about 75 % to about 25% by weight of the total amount of the material; the filler can range from 0 to about 65% by weight of the material.

For preferred embodiments, taking the amount of fiber as 100 parts by weight; the binder can preferably be used in an amount of from about 3 to about 50 parts per hundred parts of fiber (PPHF); the microspheres can preferably be in the range of from about 0.5 to about 20 PPHF and preferably, from about 1 to about 12 PPHF; when a filler is used, the filler can preferably be used in an amount of from about 10 to about 85 PPHF. When no filler is included, the instant microspheres most preferably are used in an amount in the range of from about 5 to about 40 PPHF.

It will be understood by one skilled in the art that while the amounts of the ingredients used to produce the gasket forming compositions of the present invention can be varied within the ranges specified, the amounts of each material preferred will depend upon the end use of the gasket and the characteristics required for the particular gasket.

Using current technology, expandable polymeric microspheres (either in foam or hollow shell form) can be prepared from a large variety of polymers and copolymers. Such polymers and copolymers can further, have widely differing physical properties. Monomers for the polymeric copolymeric, foam or shell portion of the expandable microspheres can be selected from the group consisting of: acrylate, acrylic acid, methacrylate, ethacrylate, propylacrylate, butylacrylate, methylmethacrylate, ethylmethacrylate, propylmethacrylate, butylmethacrylate, liquid-crystal esters, styrene, butylstyrene, chlorostyrene, vinylchloride, vinylbutenal, vinylidenechloride, vinylbenzylchloride, and acrylonitrile. Materials which might be considered for microspheres needed for high temperature applications include polymers selected from the group consisting of: liquid crystal polyesters and polyimide.

The fibers used with the instant gaskets can be inorganic or organic; and natural or synthetic. The fibers can suitably have a length in the range of from about 1 to about 15 millimeters (mm). A preferred length is from about 1 to about 5 mm. Suitable fiber diameters are in the range of from about 4 to about 50 microns, and preferably, from about 4 to about 25 microns. Suitable synthetic materials which can be made into fibers and used with the instant gaskets can be selected from the group consisting of: polyarimid, polyvinylidene chloride, polyvinyl chloride, polyimide, polybenzimidazole, polyamide-imide, polyether-imide, polyacrylate, fluornated polypropylene, fluornated polyethylene, fluornated copolymers of polyethylene and polypropylene, fluornated polyolefins, polyamides, polyesters, aromatic polyamides, and phenolic fibers. Preferred fibers can be selected from the group consisting of: cellulosic fibers, mineral wool, glass, polyaramid, polyacrylate; ceramic, and carbon fibers.

Any binder which can hold the gasket materials together thus operating to "bond" the materials together can be used with the instant invention. Such binders can be both natural and synthetic and include polymers and both natural and synthetic rubber.

Latex is a preferred binder material. Some preferred latex binders can be selected from the group consisting of: butadiene acrylonitrile, carboxylated acrylonitrile butadiene, styrene butadiene, carboxylated styrene butadiene, polychloroprenes, polyvinylidene chloride, polystyrene, polyvinyl chloride, fluornated ethylene propylene, acrylic, tetrafluoroethylene, natural rubber, polyisoprene, polyethylene propylenediene monomer, silicone latex, and polybutadiene.

Preferably the instant gaskets are prepared using fillers. A suitable filler can be selected from the group consisting of: clay, calcium silicate, talc, vermiculite, calcium carbonate, mica, diatomaceous earth, and silica. Preferred fillers which can be selected to be used with the instant gaskets can be selected from the group consisting of: clay, talc, and mica.

A variety of additives can also be included with the instant gaskets. Such additives include any additives frequently used with gaskets. Representative examples of these are: latex curing agents, cure packages, biocides, pigments, and cure accelerators.

Usually such additives are incorporated in an effective amount into the aqueous mixture at an appropriately selected point in the gasket preparation process before the wet laying and dewatering takes place. The specific time at which an additive is incorporated in the gasket making process will depend upon what the additive is, and how it is intended to operate. The curing agent, for example, is usually added with the binder, although it can also be added with the fiber and filler (if used).

The instant invention can also be readily understood from the examples that follow. It should be understood, however, that these examples are offered to illustrate the instant invention and thus, they should not be used to limit it. All parts and percentages are by weight unless otherwise indicated.

EXAMPLE 1

PART A

A gasket containing microcapsules which were expanded during the dryinq step was prepared in accordance with the following description.

The following materials were added to a mixing pulper:

(PHFF - parts per hundred parts of the total amount of fiber and filler.)

| Materials | Amount |
|---|---|
| 1. Glass Fibers (4–5 microns) | 15 PHFF |
| 2. Talc (a microtalc filler) | 35 PHFF |
| 3. Microcapsules of Polyvinylidene Chloride containing isobutane blowing agent (Marketed by Nobel Industries) | 1.5 PHFF |

Water was added so that the mixture Was at 1.5% by weight solids.

Another pulper of the following materials was prepared:

| Materials | Amount |
|---|---|
| 4. Clay Filler (Klondyke) | 50 PHFF |
| 5. Carbon Black | 0.625 PHFF |
| 6. P-oriented Styrenated Diphenylamine Antidioxident | 0.6 PHR |
| 7. Cure Package (Active ingredients of cure package: Sulfur 14% by wt. Benzoataiazol 14% by wt., and ZnO 22% by wt.) (Marketed by Harwick Chemical) | 2 PHFF |

This mixture was also adjusted to a solids content of 1.5% by weight.

Both mixtures were then agigated for 10 minutes, and then pumped into the same precipitation tank. In the precipitation tank the mixture was deluded by the addition of water to 1% by wt. (weight) solids, followed by the addition of 20 PHFF of alum (as a flocculant) and 16 PHFF Na2C03 was added as a base. Flocculation occurred and the mixture was then agigated while 30 pHFF of styrene butadiene rubber latex and 10 PHFF of carboxylated acrylonitrile butadiene latex was added as the binder.

Agitating continued until the water was clear which indicated that the latex precipitated (flocculated) onto the fibrous mixture to thereby bind and hold the fiber, microspheres, and filler in place. The mixture was then fed into a blank paper machine and the sheet was formed on a Fourdrinier wire screen and was then passed through a 15–20 psi wet press and then a 40–60 psi wet press to eliminate water; then dried on a drum dryer set at 260° F.

The polyvinylidene chloride microspheres contained low boiling hydrocarbons. These microspheres, having an unexpanded size of from 5–10 microns expanded during the drum-drying procedure to about 50–70 microns in diameter (a diameter expansion of 5 to 7 times.)

During drum-drying, as the steam and heat was produced, the microcapsules inside the gasket sheet material softened and expanded with the force of the low boiling hydrocarbon. This caused an internal densification of the fiber/filler/rubber gasket sheet. The microcapsules thus expand to fill the void spaces which usually form as the water evaporates from the sheet.

The compression/recovery of this gasket was measured at 26% compression and a 77.4% recovery.

PART B

For the purposes of comparison, a second gasket was prepared exactly as described in Example 1. except that no microcapsules were added.

PART C

In order to compare the sealing ability of the two gaskets, an Electromechanical Air Leakage Tester (EMALT) was used to test the sealing ability of both the microcapsule-containing gasket of Part A, and the gasket of Part B which had no microcapsules.

The EMALT, designed and built by Armstrong, measures the leakage of nitrogen gas out of a cylinder that is set at a selected flange pressure.

Testing proceeded as follows:

The test gaskets were each cut in to a concentric ring each measuring S.75"inches outer diameter by 2.5" inner diameter. The gasket rings were then conditioned by allowing them to sit at the 78 F. and 50–55% relative humidity for 48 hours. Each gasket ring was then fitted into the testing machine and tested. The data collected is shown in the table below. Leakage Rate shows Pressure Drop in pounds per square inch of gas pressure Drop Per Minute (PSI/Min). The smaller the value, the better the seal.

TABLE 1

|  | Gasket w/Microsphere | | Gasket w/o Microspheres | |
| --- | --- | --- | --- | --- |
|  | 1 | 2 | 3 | 4 |
| Flange Pressure | 420 | 435 | 345 | 425 |
| Test Time | 33.02 | 17.56 | .70 | 2.35 |
| Leakage Rate | 0.03 | 0.057 | 0.588 | 0.426 |
| Flange Pressure | 500 | 595 | 480 | 595 |
| Test Time | 53.7 | 72.57 | 4.64 | 9.10 |
| Leakage Rate | 0.019 | 0.0138 | 0.2155 | 0.11 |
| Flange Pressure | 700 | 710 | 620 | 770 |
| Test Time | 270.9 | 590.0 | 17.30 | 36.52 |
| Leakage Rate | 0.0037 | 0.0017 | 0.0578 | 0.0274 |

The data of Table 1 shows that gaskets with microspheres yield an excellent seal at 720–800 psi; the gasket without microspheres, however, need the higher pressure of 1025–1150 psi. for an excellent seal.

Use of in-gasket expanded beads lowers flange pressure needed for an excellent seal by approximately 300 psi. (A difference of approximately 30% lower flange pressure needed when expandable microspheres are used.)

EXAMPLE 2

A gasket was prepared having the same ingredients as the gasket prepared under Part A of Example 1, except that the microspheres were used in the amount of 2 PHFF.

This gasket was prepared using the same method as is described in Example 1, Part A, except that the wet gasket was allowed to dry over a 24 hour period at room temperature instead of using a drum-dryer. This variation produced a gasket sheet material which did not have expanded spheres. The thickness and density of the sheet having these unexpanded spheres was measured. The spheres were then expanded by passing the dried sheet through drum driers set at 125° C. No steam was present since the sheet was dry and the thickness and density of the sheet were again measured. The results of these density and thickness measurements and the measurement of the gasket produced in part A of Example 1 are:

TABLE 2

|  | Thickness | Density |
| --- | --- | --- |
| Before Expansion | .078 gauge | 54.5 lb/Ft3 |
| After Expansion | .083 gauge | 49.7 lb/Ft3 |
| Gasket Sheet of Part A, Example 1 |  | 49.4 lb/Ft3 |

It is felt that the relatively close value of the density for the gaskets of Example 1, Part A, and Example 2 indicates that the particular spheres used will expand better in the presence of steam.

What is claimed is:

1. A gasket material comprising a wet-laid gasket sheet which has good sealability, good compressive strength and good compression/ recover; further providing that the wet-laid gasket sheet includes fiber, expanded polymeric microspheres and a binder, wherein the fibers and expanded microspheres are held by the binder, and wherein the said expanded microspheres inflated inside the wet-laid sheet after it was formed.

2. A gasket material as described in claim 1 wherein the wet-laid gasket sheet also includes a filler, with the fiber, expanded microspheres and binder.

3. A gasket material as described in claim 1 wherein the microspheres are present at an amount in the range of from about 0.75 to about 0.25% by weight of the total amount of gasket material.

4. A gasket material as described in claim 1 wherein the fiber is comprised of a material selected from the group consisting of cellulosic, mineral wool, glass, polyaramid, polyacrylate, ceramic, and carbon fibers; and wherein the binder is comprised of a material selected from the group consisting of: butadiene acrylonitrile, carboxylated acrylonitrile butadiene, styrene butadiene, carboxylated styrene butadiene, polychloroprenes, polyvinylidene chloride, polystyrene, polyvinyl chloride, fluornated ethylene propylene, acrylic, tetrafluoroethylene, natural rubber, polyisoprene, polyethylene propylenediene monomer, silicone latex, and polybutadiene.

5. A gasket material as described in claim 3 wherein the wet-laid gasket sheet also includes a filler with the fiber, expanded microspheres, and binder.

6. A gasket material as described in claim 3 wherein the fiber is present at an amount in the range of from about 5.0 to about 75% by weight of the total material and the binder is present at an amount in the range of from about 3 to about 60% by weight of the total material.

7. A gasket material as described in claim 1 wherein the gasket sheet includes cellulosic fibers.

8. A gasket material as described in claim 1 wherein the wet-laid gasket sheet also includes unexpanded, expandable microspheres.

9. A gasket material as described in claim 1 wherein after it was formed, the wet-laid gasket sheet was dried, further providing that the microspheres inflated in the presence of heat which was applied after the wet-laid sheet was dried.

10. A gasket material as described in claim 1 wherein the wet-laid gasket sheet was formed and then dried further providing that the microspheres inflated during drying.

11. A gasket material as described in claim 9 wherein after drying the wet-laid gasket sheet was pressed, and during pressing the heat was applied to inflate the microspheres.

12. A gasket material was described in claim 3 wherein the fiber includes cellulosic fibers.

13. A gasket material comprising: a wet-laid gasket sheet which has good sealability, good compressive strength and good compression/recovery further providing that the wet-laid gasket sheet includes fiber; unexpanded, expandable polymeric microspheres; and a binder, wherein the fibers and microspheres are held by the binder, and wherein the said microspheres will expand in the presence of an effective amount of heat to give internal densification.

14. A gasket material as described in claim 13 where substantially all of the unexpanded, expandable polymeric microspheres have an average diameter in the range of from about 0.5 to about 75 microns, and wherein the said microspheres can, by expansion, provide a microsphere volumetric increase of at least 10%.

15. A gasket material as described in claim 13 wherein the wet-laid gasket sheet also includes a filter.

16. A gasket material as described in claim 13 wherein the microspheres are present in an amount in the range of from about 0.075 to about 25% by weight of the total amount of gasket material.

17. A gasket material as described in claim 13 wherein the microspheres are present in an amount in the range of from about 0.75 to about 25% by weight of the total amount of gasket material.

18. A gasket comprising a mixture which includes fiber, expanded polymeric microspheres, and a binder, wherein the mixture is a gasket sheet having good sealability, good compression/recovery, and good compressive strength further providing that the polymeric microspheres expanded, in the sheet to cause internal densification.

19. The gasket of claim 18 wherein the fiber is present in an amount of from about 5 to about 75% by weight, the polymeric microspheres are present in an amount of from about 0.75 to about 25% by weight, and the binder is present in an amount of from about 3 to about 60% by weight.

20. A gasket as described in claim 19 wherein a filler is present in an amount of from about 10 to about 85 parts per hundred parts of fiber.

21. A gasket as described in claim 18 which includes a filler.

22. A gasket as described in claim 21 wherein the filler is selected from the group consisting of: clay, calcium silicate, talc, vermiculite, calcium carbonate, mica, diatomaceous earth and silica.

23. A gasket as described in claim 18 which is a wet-laid gasket.

24. A gasket as described in claim 18 wherein the filter is comprised of a material selected from the group consisting of cellulosic, mineral wood, glass, polyaramid, polyacrylate, ceramic and carbon fibers.

25. A gasket as described in claim 18 wherein the binder is selected from the group consisting of: butadiene acrylonitrile, carboxylated acrylonitrile butadiene, styrene butadiene, carboxylated styrene butadiene, polychloroprenes, polyvinylidene chloride, polystyrene, polyvinyl chloride, fluornated ethylene propylene, acrylic, tetrafluoroethylene, natural rubber, polyisoprene, polyethylene propylenediene monomer, silicone latex and polybutadiene.

26. A gasket material as described in claim 8 wherein substantially all of the unexpected, expandable polymeric microspheres have an average diameter in the range of from about 0.05 to about 75 microns, and wherein the said microspheres can, by expansion, provide a microsphere volumetric increase of at least 10%.

27. The gasket material of claim 1 wherein the wet-laid gasket sheet was prepared by adding flocculatn and base to an aqueous suspension which included fibers and the microspheres, adding the binder with agitation, and then dewatering.

28. The gasket material of claim 10 wherein the microspheres are present at an amount in the range of from about 0.75 to about 25% by weight of the total amount of gasket material.

29. A gasket material as described in claim 10 which includes a filler.

30. A gasket material as described in claim 10 wherein the fiber includes cellulosic fibers.

31. The gasket of claim 23 wherein the wet-laid gasket was prepared by adding flocculant and base to an aqueous suspension that included the fiber and the microspheres, adding the binder with agitation, and then dewatering.

32. The gasket of claim 23 which includes a filler.

33. The gasket of claim 23 wherein the microspheres are present at an amount in the range of from about 0.75 to about 25% by weight of the total amount of gasket material.

34. The gasket of claim 18 wherein the microspheres are present at an amount in the range of from about 0.05 to about 20 parts per hundred parts of fiber.

* * * * *

UNITED STATES PATENT AND TRADEMARK OFFICE
CERTIFICATE OF CORRECTION

PATENT NO. : 4,946,737

DATED : August 7, 1990

INVENTOR(S) : Charles M. Lindeman et al

It is certified that error appears in the above-identified patent and that said Letters Patent is hereby corrected as shown below:

In column 5, line 36, the number "80" should read as "30"; in column 6, line 8, the number "75%" should read as ".75%"; in column 8, line 63, the number "S.75" should read as "3.75"; and in column 8, line 65, the number "78F." should read as "73F.".

In the claims, in column 9, claim 1, line 62, the word "recover" should read as "recovery"; in column 10, claim 3, line 6, the number "0.25%" should read as "25%"; and in column 10, claim 16, line 67, the number "13" should read as "15".

Signed and Sealed this

Twentieth Day of August, 1991

Attest:

HARRY F. MANBECK, JR.

*Attesting Officer*  *Commissioner of Patents and Trademarks*